(12) United States Patent
Fujiwara et al.

(10) Patent No.: US 6,871,538 B2
(45) Date of Patent: Mar. 29, 2005

(54) FLOW SENSOR AND FLOW RATE MEASURING METHOD

(75) Inventors: Takeshi Fujiwara, Nara (JP); Sho Sasaki, Nara (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/714,284

(22) Filed: Nov. 14, 2003

(65) Prior Publication Data

US 2004/0098210 A1 May 20, 2004

(30) Foreign Application Priority Data

Nov. 15, 2002 (JP) ........................................ 2002-332541

(51) Int. Cl.$^7$ ............................................. G01F 1/68
(52) U.S. Cl. .................................................. 73/204.26
(58) Field of Search ..................... 73/204.26, 204.25, 73/204.15, 204.7

(56) References Cited

U.S. PATENT DOCUMENTS

| | | | | |
|---|---|---|---|---|
| 5,533,412 A | * | 7/1996 | Jerman et al. | 73/861.95 |
| 6,250,150 B1 | * | 6/2001 | Azumi | 73/204.26 |
| 6,349,596 B1 | * | 2/2002 | Nakada et al. | 73/204.26 |
| 6,684,694 B2 | * | 2/2004 | Fujiwara et al. | 73/204.26 |

FOREIGN PATENT DOCUMENTS

| | | | | |
|---|---|---|---|---|
| JP | 5-289751 | 11/1993 | ............ | G05D/7/06 |
| JP | 10-9919 | 1/1998 | .............. | G01F/1/68 |
| JP | 10-213469 | 8/1998 | .............. | G01F/1/68 |
| JP | 2003-90751 | 3/2003 | ............ | G01F/1/692 |

OTHER PUBLICATIONS

Patent Abstracts of Japan; Publication No. 10-213469 dated Aug. 11, 1998 (1 pg.).
Patent Abstracts of Japan; Publication No. 05-289751 dated Nov. 5, 1993 (1 pg.).
Patent Abstracts of Japan; Publication No. 10-009919 dated Jan. 16, 1998 (1 pg.).
Patent Abstracts of Japan; Publication No. 2003-090751 dated Mar. 28, 2003 (1 pg.).

* cited by examiner

*Primary Examiner*—Edward Lefkowitz
*Assistant Examiner*—Jewel V. Thompson
(74) *Attorney, Agent, or Firm*—Osha & May L.L.P.

(57) ABSTRACT

A flow sensor and a flow rate measuring method are disclosed, in which an error caused by dust attached to the flow sensor is accurately corrected taking advantage of the fact that the output characteristic of the flow sensor representing the relation between the temperature measured by a temperature measuring unit and the flow rate of the fluid undergoes a change with the dust attached. The flow sensor includes a thin-film bridge unit formed on a substrate, a heater arranged on the bridge unit, and a temperature measuring unit arranged on the bridge unit.

8 Claims, 11 Drawing Sheets

Fig. 1

PRIOR ART

Fig. 2

PRIOR ART

Fig. 3

PRIOR ART

Fig. 4

PRIOR ART

PRIOR ART

Fig. 7

PRIOR ART

FLOW SENSOR AND FLOW RATE MEASURING METHOD

CROSS-REFERENCE TO RELATED APPLICATIONS

This application claims priority from Japanese Patent Application No. 332541/2002 filed Nov. 15, 2002.

BACKGROUND OF THE INVENTION

1. Field of the Invention

The present invention relates to a flow sensor and a flow rate measuring method.

2. Description of the Prior Art

Figure 1:
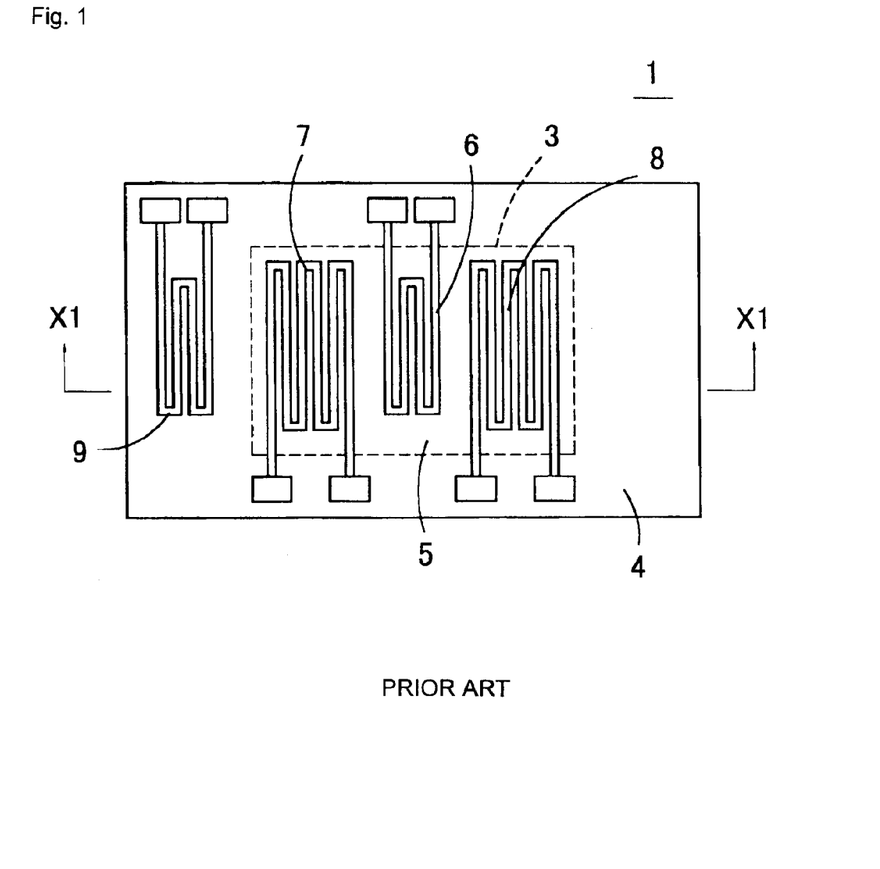
FIG. 1 shows a plan view showing the structure of the conventional flow sensor.
Figure 2:
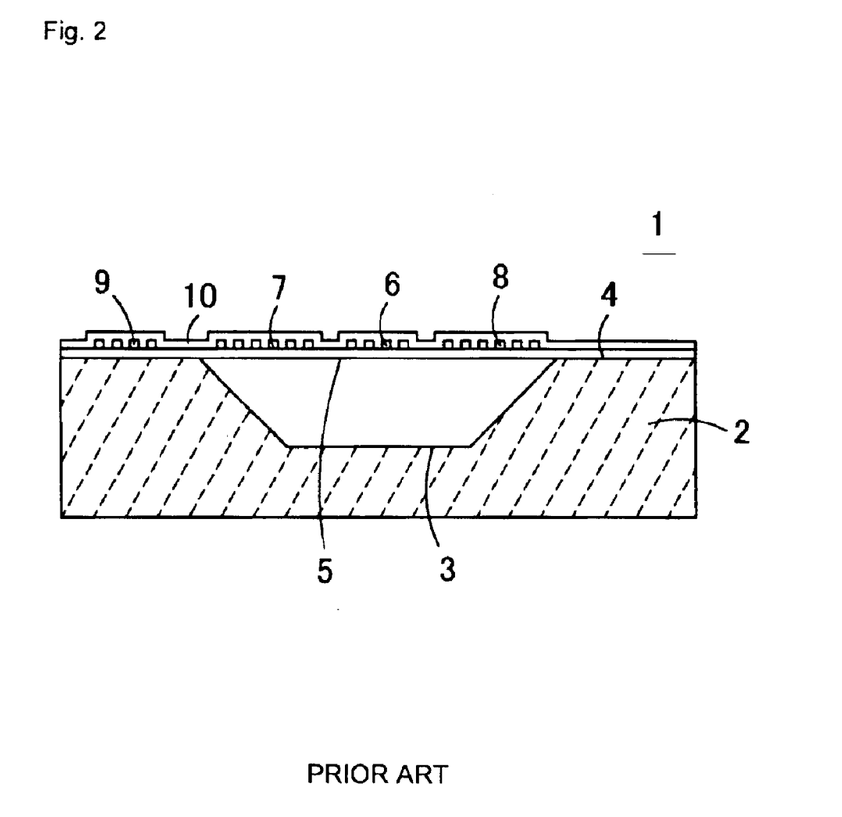
FIG. 2 shows a sectional view taken in line X1—X1 in FIG. 1.

A flow sensor 1 having the conventional structure is schematically shown in FIGS. 1 and 2. FIG. 2 is a sectional view taken in line X1—X1 in FIG. 1. In FIG. 1, the heater and the temperature measuring unit are shown in exposed form, while the heater and the temperature measuring unit are shown in the form covered by a protective film 10 or the like in FIG. 2. In this flow sensor 1, a depressed space portion 3 is formed in the upper surface of a silicon substrate 2, an insulating thin film 4 is formed on the upper surface of the silicon substrate 2 in such a manner as to cover the space portion 3, and a thin-film bridge portion 5 is formed over the space portion 3 by a part of the insulating thin film 4. The bridge portion 5 is thermally insulated from the silicon substrate 2 by the space (air) in the space portion 3. A heater 6 is arranged at the central portion on the surface of the bridge portion 5, and temperature measuring units 7, 8 are arranged symmetrically about the heater 6 on both sides thereof. The heat-sensing temperature measuring units 7, 8 are formed of a thin film resistor of an iron-nickel alloy, for example, and is capable of measuring the temperature utilizing the change in resistance value with temperature. The surface of the insulating thin film 4 outside the bridge portion 5 is formed with an ambient temperature measuring resistor 9. Further, the silicon substrate 2 is covered by a protective film 10 in such a manner as to protect the heater 6, the temperature measuring units 7, 8 and the ambient temperature measuring resistor 9.

Figure 3:
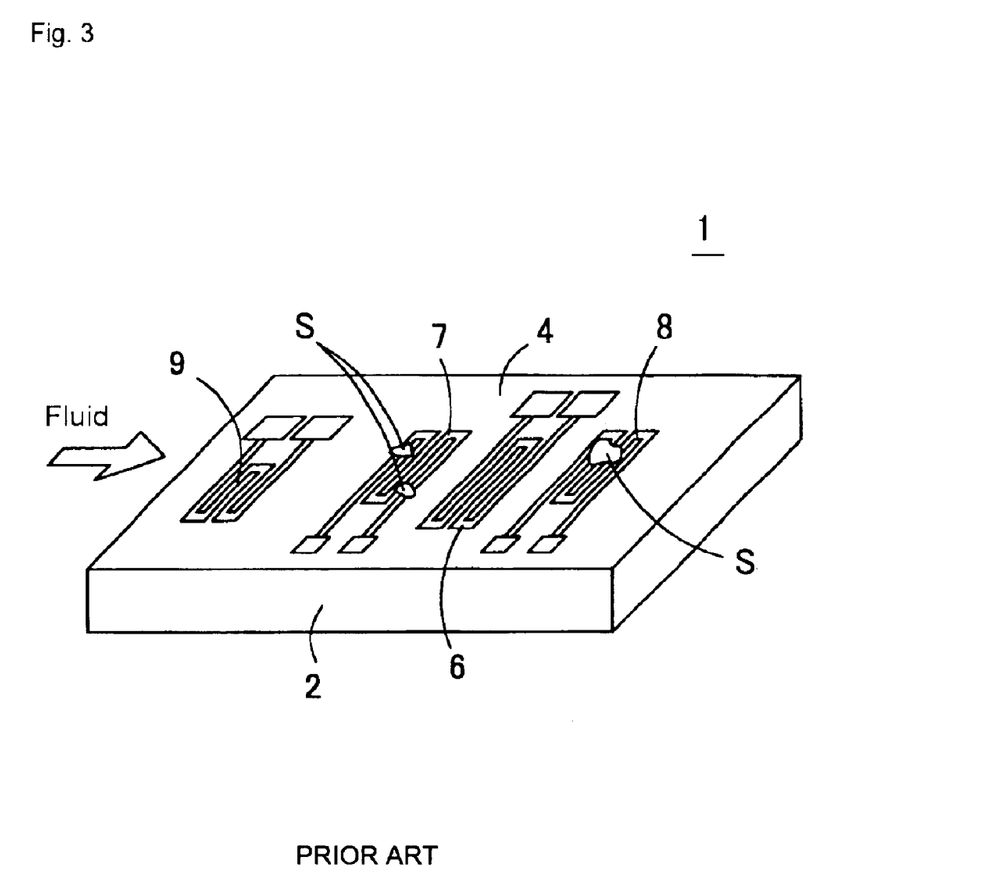
FIG. 3 shows a perspective view schematically showing the manner in which the flow sensor is arranged in a fluid.

The flow sensor 1 is arranged in the flow path generating a flow of a fluid (the direction in which the fluid flows is indicated by arrow in FIG. 3) as shown in FIG. 3, and the output of the temperature measuring units 7, 8 is monitored while generating heat by supplying current through the heater 6. Specifically, the ambient temperature measuring resistor 9 measures the ambient temperature Tatm, and the heater 6 is controlled to generate heat at a temperature higher by a predetermined value than the ambient temperature Tatm measured by the ambient temperature measuring resistor 9 regardless of the fluid flow rate. Now, assume the following definitions:

V: Mass flow rate of fluid

Cu0: Heat capacity of temperature measuring unit 7

Cd0: Heat capacity of temperature measuring unit 8

Tu(V): Temperature of temperature measuring unit 7 with fluid mass flow rate V

Td(V): Temperature of temperature measuring unit 8 with fluid mass flow rate V

Qu(V): Energy supplied to temperature measuring unit 7 with mass flow rate V, and Qd(V): Energy supplied to temperature measuring unit 8 with mass flow rate V.

The energy Qu(V), Qd(V) supplied to the temperature measuring unit 7 or 8 in the case where the fluid mass flow rate (hereinafter simply referred to as the flow rate) is V is defined as the energy [=(energy absorbed as heat)−(energy radiated as heat)] supplied to the temperature measuring unit 7 or 8, as the case may be, until a (quasi) equilibrium is reached from the state in which the temperature of the temperature measuring unit 7 or 8 is equal to the ambient temperature Tatm (when the heater 6 is off, for example) as a starting point to the state in which the heater generates heat at a temperature higher by a predetermined value than the ambient temperature Tatm with the fluid passing through the flow sensor 1 at the flow rate V.

At the windless time when no fluid is flowing (i.e. when V=0), equations (1) and (2) below hold. The temperature difference $\Delta Tu0(0)$, $\Delta Td0(0)$ between the temperature $Tu(0)$, $Td(0)$ of the temperature measuring unit 7, 8 and the ambient temperature Tatm with the flow rate of zero is referred to hereinafter as an offset temperature.

$$\Delta Tu0(0)=Tu(0)-Tatm=Qu(0)/Cu0 \quad (1)$$

$$\Delta Td0(0)=Td(0)-Tatm=Qd(0)/Cd0 \quad (2)$$

When the wind is blowing, i.e. the fluid is flowing at the flow rate V, on the other hand, equations (3) and (4) below hold.

$$\Delta TuV(V)=Tu(V)-Tatm=Qu(V)/Cu0 \quad (3)$$

$$\Delta TdV(V)=Td(V)-Tatm=Qd(V)/Cd0 \quad (4)$$

As a difference between equations (3) and (1), the following equation (5) is obtained.

$$\Delta Tu(V)=[Qu(V)-Qu(0)]/Cu0+\Delta Tu0(0) \quad (5)$$

Also, as a difference between equations (4) and (2), the following equation (6) is obtained.

$$\Delta Td(V)=[Qd(V)-Qd(0)]/Cd0+\Delta Td0(0) \quad (6)$$

Figure 4:
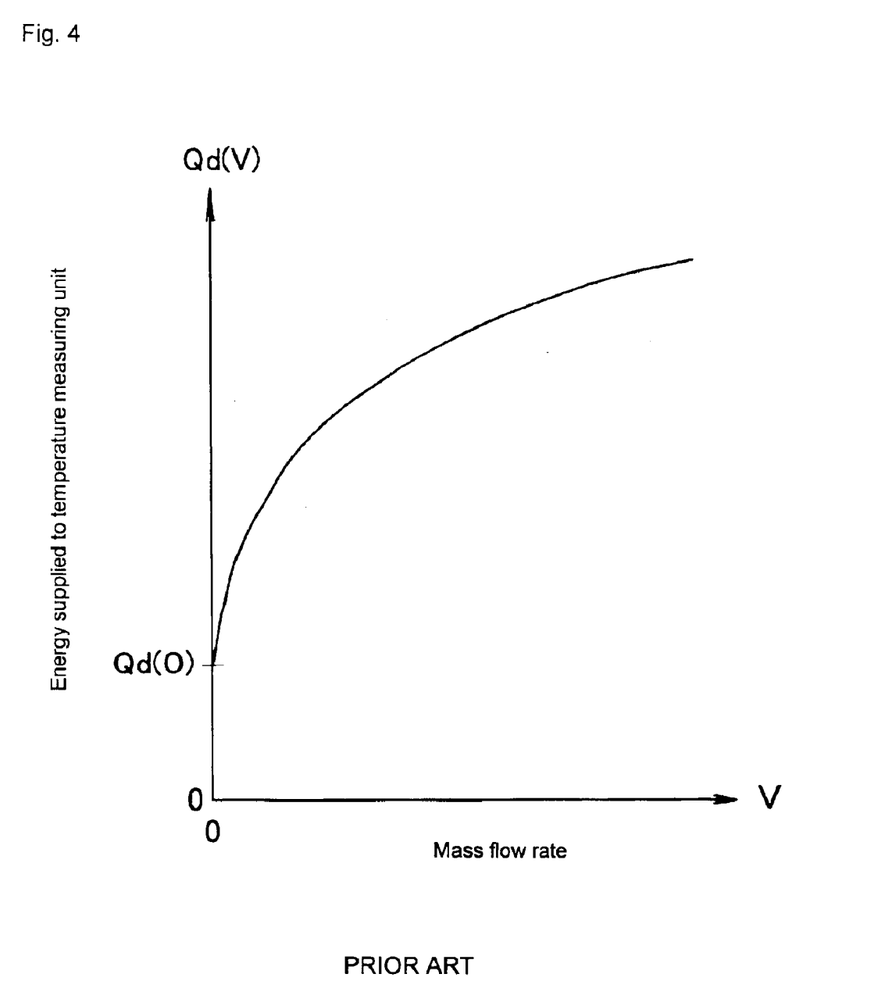
FIG. 4 shows the relation between the energy Qd(V) supplied to the downstream temperature measuring unit and the fluid flow rate V.
Figure 5A:
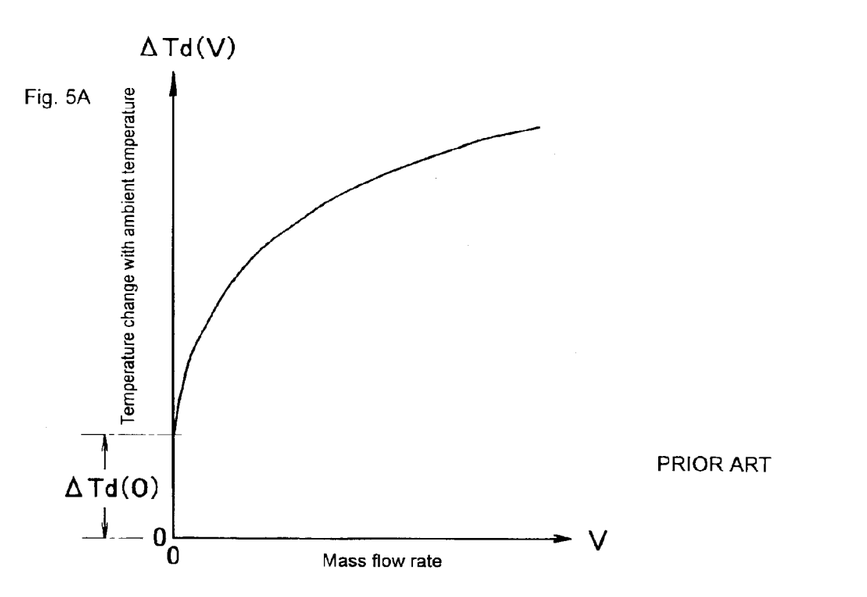
FIG. 5A shows the relation between the temperature change ΔTd(V) of the downstream temperature measuring unit with respect to the ambient temperature and the fluid flow rate V.

The energy Qd(V) supplied to the temperature measuring unit 8 when the flow rate is V is expressed by a curve as shown in FIG. 4, for example. Thus, according to equation (5), the relation between the temperature change $\Delta Td(V)$ of the temperature measuring unit 8 on downstream side with the ambient temperature and the fluid flow rate V is illustrated as an output characteristic shown in FIG. 5A, as an example, assuming that the heat capacity Cd0 and the offset temperature $\Delta Td0(0)$ are known. On the other hand, according to equation (6), the relation between the temperature change $\Delta Tu(V)$ of the temperature measuring unit 7 on upstream side with the ambient temperature and the fluid flow rate V is illustrated as an output characteristic shown in FIG. 5B, as an example, assuming that the heat capacity Cu0 and the offset temperature $\Delta Tu0(0)$ are known. The initial output characteristic indicating the temperature change $\Delta Tu(V)$ and the initial output characteristic indicating the temperature change $\Delta Td(V)$ are stored in the memory of the operation processing unit of the flow sensor 1. By calculating the temperature change $\Delta Td(V)$ with the ambient temperature from the temperature Td(V) measured by the temperature measuring unit 8 and the ambient temperature Tatm measured by the ambient temperature measuring resistor 9, therefore, the value of the flow rate V can be determined using the initial output characteristic shown in FIG. 5A. In similar fashion, by calculating the temperature change $\Delta Tu(V)$ with the ambient temperature from the temperature Tu(V) measured by the temperature measuring unit 7 and the ambient temperature Tatm measured by the ambient temperature measuring resistor 9, the value of the flow rate V can be determined using the initial output characteristic shown in FIG. 5B. In this way, the use of one of the initial output characteristics shown in FIGS. 5A and 5B can determine the flow rate V of the fluid from the value of ΔTd(V) or ΔTu(V). As an alternative, the flow rate V is determined from the two output characteristics of FIGS. 5A and 5B, and an average value is calculated.

In an environment where the flow sensor is used, the fluid usually contains dust and dirt. Once dust S attaches to the temperature measuring unit 7 or 8 as shown in FIG. 3, the heat capacity of the temperature measuring unit 7 increases beyond the initial heat capacity Cu0 to Cuc (>Cu0), while the heat capacity of the temperature measuring unit 8 increases beyond the initial heat capacity Cd0 to Cdc (>Cd0). Even in the case where the dust S attaches, the relation between the energy Qu(V), Qd(V) supplied to the temperature measuring unit 7, 8 and the flow rate V is considered to remain substantially unchanged. When the dust S attaches to the temperature measuring unit 7, 8, therefore, the aforementioned equations (5) and (6) become the following equations (7) and (8), respectively.

$$\Delta Tuc(V) = [Qu(V) - Qu(0)]/Cuc + \Delta Tuc(0) \quad (7)$$

$$\Delta Tdc(V) = [Qd(V) - Qd(0)]/Cdc + \Delta Tdc(0) \quad (8)$$

where $$\Delta Tuc(0) = Qu(0)/Cuc \quad (9)$$

$$\Delta Tdc(0) = Qd(0)/Cdc \quad (10)$$

Figure 6:
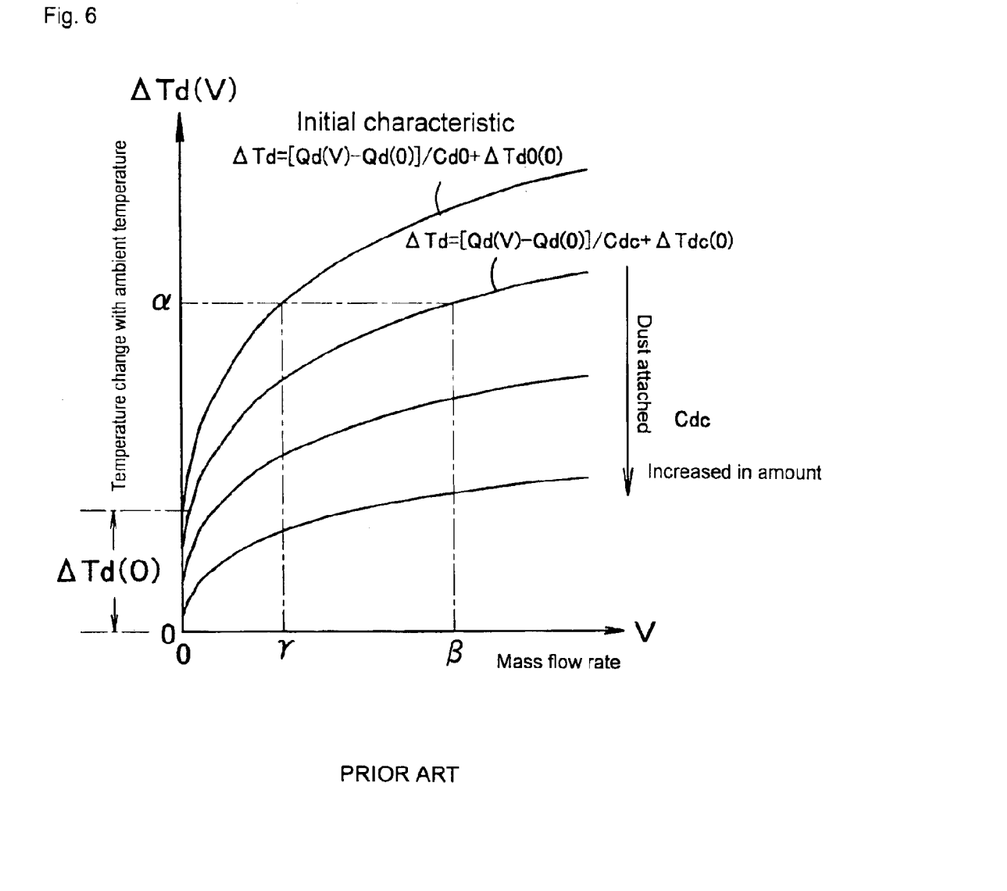
FIG. 6 shows the initial characteristic of the temperature ΔTd(V) measured by the downstream temperature measuring unit and the characteristic with dust attached.

Therefore, the relation between the temperature change ΔTd(V) of the downstream temperature measuring unit 8 and the fluid flow rate V is such that according as the heat capacity Cdc of the temperature measuring unit 8 increases with the increase in the amount of dust S attached, the output characteristic indicating the temperature change ΔTd(V) changes downward gradually from the initial output characteristic with a smaller gradient as shown in FIG. 6. Also, in the case where the flow rate V is zero, the offset temperature ΔTdc(0) (=Qd(0)/Cdc) for the flow rate V of zero decreases with the increase in heat capacity Cdc.

Figure 5B:
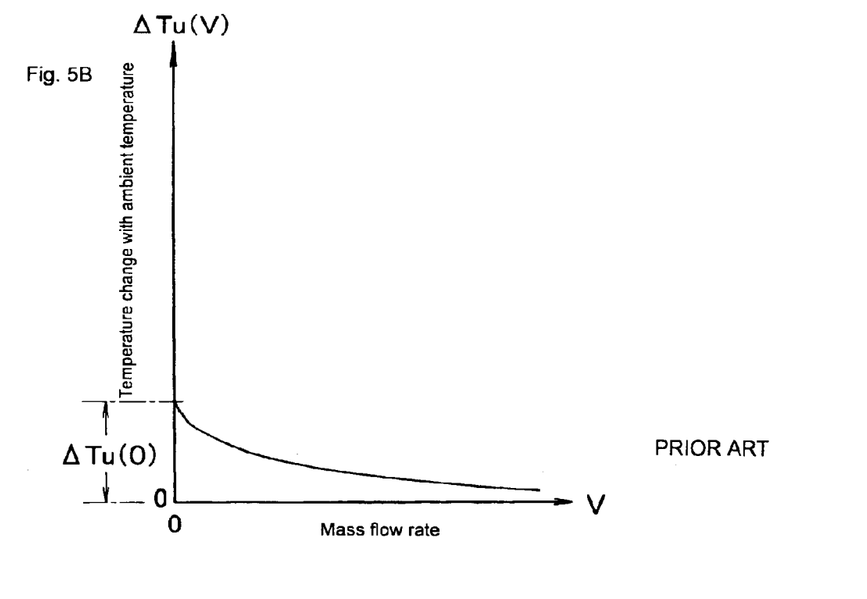
FIG. 5B shows the relation between the temperature change ΔTu(V) of the upstream temperature measuring unit with respect to the ambient temperature and the fluid flow rate V.

The conventional flow sensor 1, however, fails to take into consideration the change in the output characteristic due to the dust attached or the like, and has no correcting means. As a result, assuming that the dust S attaches to the temperature measuring unit 8 and the heat capacity of the temperature measuring unit 8 becomes Cdc, so that the characteristic of the temperature measuring unit 8 changes as indicated by the curve expressed in FIG. 6 as shown below, $$\Delta Td(V) = [Qd(V) - Qd(0)]/Cdc + \Delta Tdc(0)$$

then, the actual value of the flow rate V for the measurement ΔTd(V)=α becomes β. In the conventional flow sensor 1, however, the flow velocity is determined based on the initial output characteristic stored in the memory, and therefore the flow rate calculated by the flow sensor 1 for ΔTd(V)=α is V=γ as shown in FIG. 6. In this way, the conventional flow sensor 1 poses the problem that the attached dust or the like causes an error between the output flow rate value and the actual flow rate. This problem is similarly encountered by the output characteristic of the temperature measuring unit 7 shown in FIG. 5B.

Figure 7:
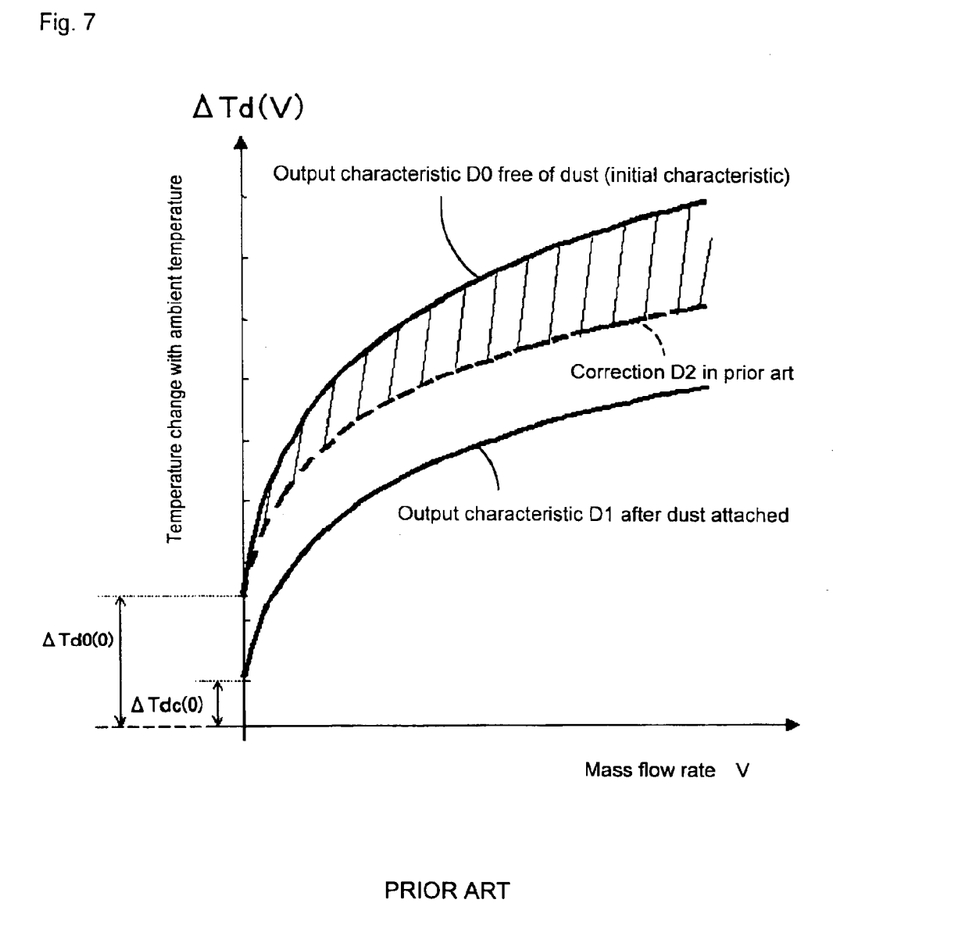
FIG. 7 shows a diagram for explaining a conventional method of correcting the output characteristic of the flow sensor.

A method of correcting the zero point of the output characteristic using a block valve is available. In this method, however, only the point where the flow rate is zero is corrected, but the change in the profile of the output characteristic is not corrected. Also, the actual output characteristic is not rectilinear as disclosed in the cited patent publication. As shown in FIG. 7, therefore, even in the case where the offset temperature ΔTdc(0) of the output characteristic D1 after dust is attached is corrected to coincide with the offset temperature ΔTd0(0) stored in the memory and the output characteristic D1 is shifted to the output characteristic D2, the portion hatched in FIG. 7 still remains as an error. Thus, the error cannot be sufficiently corrected.

SUMMARY OF THE INVENTION

An object of this invention is to provide a flow sensor comprising a thin-film bridge unit supported in the air over the surface of a substrate, a heater and a temperature measuring unit arranged on the bridge unit, and storage means for storing the relation between the temperature measured by the temperature measuring unit in the initial state and the flow rate of a fluid to be measured, wherein the output of the temperature measuring unit is corrected using the ratio of the value of the temperature measured by the temperature measuring unit with the flow rate of zero in the initial state to the temperature measured by the temperature measuring unit with the flow rate of zero during the operation, and the flow rate of the fluid is determined based on the corrected value of the output of the temperature measuring unit and the relation stored in the storage means. In this case, the difference with the ambient temperature (room temperature) rather than the temperature itself is preferably used as the temperature measured by the temperature measuring unit.

In the flow sensor according to the invention, the ratio is calculated between the value of the temperature measured by the temperature measuring unit with the flow rate of zero in the initial state and the temperature measured by the temperature measuring unit with the flow rate of zero during the operation. Therefore, the rate of change of the heat capacity of the temperature measuring unit due to the attached dust or the like can be estimated using the particular ratio. Also, by use of the ratio between the measured temperatures, the temperature measured by the temperature measuring unit is corrected, and the measured temperature can be converted into the temperature measurement in the initial state, thereby making possible accurate calculation of the flow rate.

Another object of the invention is to provide a flow rate measuring method using a heater, a temperature measuring unit for measuring the ambient temperature changing with the flow rate of a fluid, and storage means for storing the relation between the temperature measured by the temperature measuring unit in the initial state and the flow rate of the fluid to be measured, wherein the ratio of the value of the temperature measured by the temperature measuring unit with the flow rate of zero in the initial state to the temperature measured by the temperature measuring unit with the flow rate of zero during the operation, is multiplied by the output of the temperature measuring unit to correct the same output, and the flow rate of the fluid is determined based on the corrected value of the output of the temperature measuring unit and the relation stored in the storage means. In this case, the difference with the ambient temperature (room temperature) rather than the temperature itself is preferably used as the temperature measured by the temperature measuring unit.

In the flow rate measuring method according to the invention, the ratio of the value of the temperature measured by the temperature measuring unit with the flow rate of zero in the initial state to the temperature measured by the temperature measuring unit with the flow rate of zero during the operation. Therefore, the rate of change in the heat capacity of the temperature measuring unit due to the attached dust or the like can be estimated, and by use of this ratio between the temperature measurements, the temperature measured by the temperature measuring unit is corrected. In this way, the measured temperature can be converted to the temperature measurement in the initial state, thereby making it possible to calculate the fluid flow rate accurately.

DESCRIPTION OF THE PREFERRED EMBODIMENTS

Figure 8:
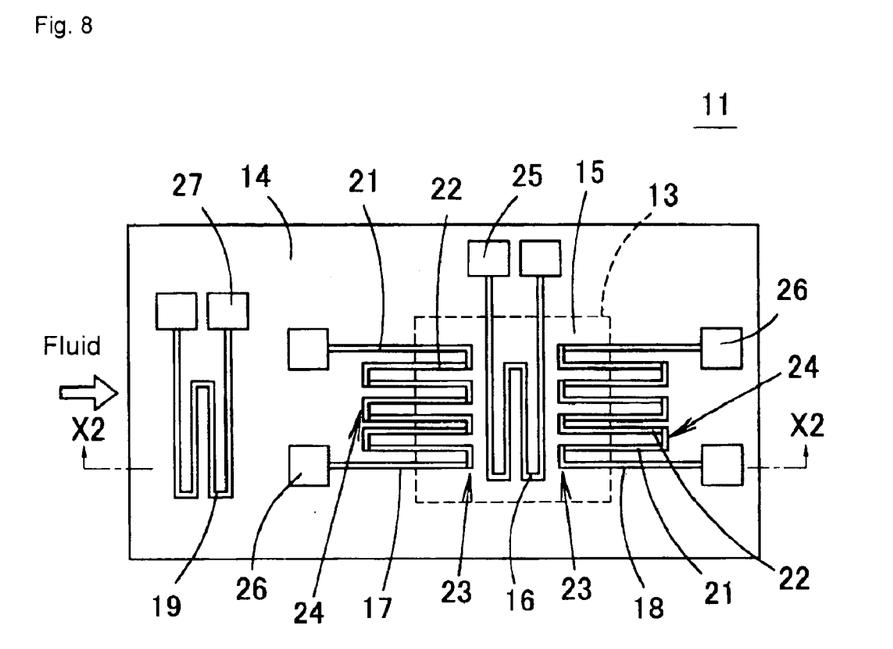
FIG. 8 shows a plan view showing the structure of the flow sensor according to an embodiment of the invention.
Figure 9:
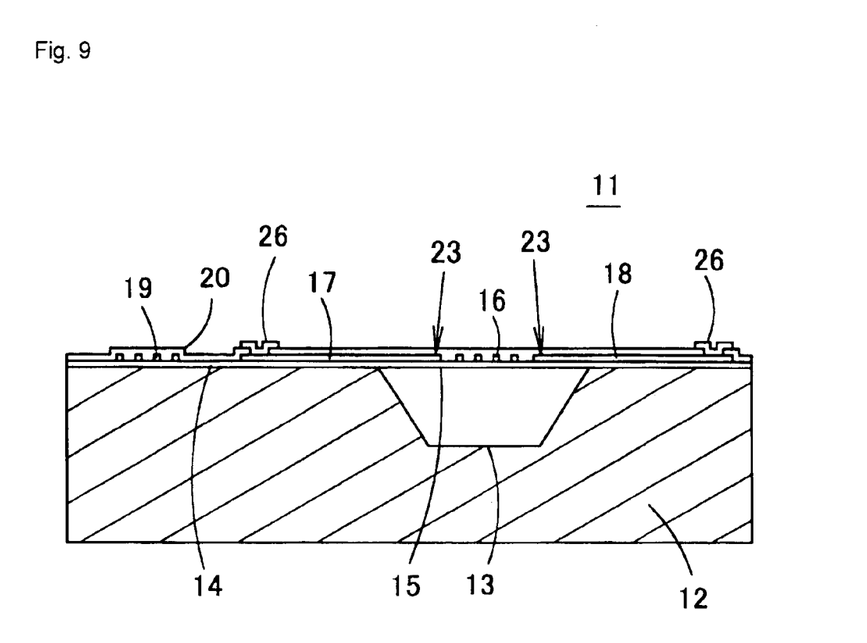
FIG. 9 shows a sectional view taken in line X2—X2 in FIG. 8.

The structure of a flow sensor 11 according to an embodiment of the invention is shown in FIGS. 8 and 9. FIG. 9 is a sectional view taken in line X2—X2 in FIG. 8, and FIG. 8 is a plan view of thermopiles 17, 18 exposed with the protective film 20, etc. removed. In this flow sensor 11, a depressed space portion 13 wider upward is formed in the upper surface of a silicon substrate 12, and an insulating film 14 of $SiO_2$ or the like is formed on the upper surface of the silicon substrate 12 in such a manner as to cover the space portion 13. A part of the insulating film 14 forms a thin-film bridge unit 15 supported in the air above the space portion 13. This bridge unit 15 is thermally insulated from the silicon substrate 12 by the space portion 13. The surface of the bridge unit 15 is formed with a heater 16 of polysilicon at the central portion thereof, and thermopiles 17, 18 making up temperature measuring units are arranged symmetrically on the upstream and downstream sides of the heater 16. Also, outside the bridge unit 15, an ambient temperature measuring resistor 19 of polysilicon for sensing the ambient temperature is arranged on the insulating film 14. The silicon substrate 12 is covered by a protective film 20 in such a manner as to protect the heater 16, the thermopiles 17, 18 and the ambient temperature measuring resistor 19.

The thermopiles 17, 18 are configured of thermocouples of polysilicon/aluminum. A first thin wire 21 of polysilicon and a second thin wire 22 are arranged alternately and in parallel to each other in such a position as to cross the edges of the bridge unit 15. The junctions of the first thin wire 21 and the second thin wire 22 in the bridge unit 15 make up a group of hot junctions 23, while the junctions of the first thin wire 21 and the second thin wire 22 outside the bridge unit 15 make up cold junctions 24. Also, the heater 16 of polysilicon and the first thin wire 21 are doped with phosphor (P) at the rate of $1.0 \times 10^{19}$ ions/cm$^3$.

The cold junctions 24 are located on the silicon substrate 12 functioning as a heat sink, and therefore the temperature thereof is not easily changed by contact with a gas. The hot junctions 23, on the other hand, which are formed on the bridge 15 raised from the silicon substrate 12, have a small heat capacity and are easily changed in temperature by contact with a gas.

In this flow sensor 11, assume that the thermopiles 17, 18 each have n hot junctions 23 and n cold junctions 24, the temperature of the hot junctions 23 with the fluid flowing at the flow rate (mass flow rate) V is Tu(V), Td(V) and the temperature of the cold junctions 24 is Tatm (ambient temperature). Then, the output voltages of (the voltages across) the thermopiles 17, 18 are Vthermu, Vthermd are expressed by equations (11) and (12), respectively.

$$Vthermu = n \cdot \alpha(Tu(V) - Tatm) \qquad (11)$$

$$Vthermd = n \cdot \alpha(Td(V) - Tatm) \qquad (12)$$

where α is the Seebeck function. Measuring the output voltage Vthermu of thermopile 17, therefore, the temperature change (hereinafter referred to as the measured temperature of thermopile 17) ΔTu(V) of the hot junctions 23 (the temperature measuring unit on upstream side) of thermopile 17 with respect to the ambient temperature is expressed by equation (13) below.

$$\Delta Tu(V) = Tu(V) - Tatm = Vthermu/(n \cdot \alpha) \qquad (13)$$

In similar manner, measuring the output voltage Vthermd of the thermopile 18, the temperature change (hereinafter referred to as the measured temperature of the thermopile 18) ΔTd(V) of the hot junctions 23 (the temperature measuring unit on downstream side) of the thermopile 18 with respect to the ambient temperature is expressed by equation (14) below.

$$\Delta Td(V) = Td(V) - Tatm = Vthermd/(n \cdot \alpha) \qquad (14)$$

Reference numerals 25, 26 and 27 designate wire pads for wire bonding to the heater 16, the thermopiles 17, 18 and the ambient temperature measuring resistor 19, respectively.

Also in this flow sensor 11, the heater 16 is supplied with current to generate heat while monitoring the output of the upstream and downstream thermopiles 17, 18. During the windless time when no gas is flowing, the output voltage of the thermopile 17 and that of the thermopile 18 are equal to each other. In the case where the gas moves from upstream toward downstream in the direction indicated by arrow in FIG. 8, however, the hot junctions 23 of the upstream thermopile 17 are cooled and drop in temperature for a smaller output voltage. The temperature of the hot junctions 23 of the downstream thermopile 18, on the other hand, is increased by the heat carried by the gas for a higher output voltage. By calculating the measured temperatures $\Delta Tu(V)$, $\Delta Td(V)$ of the thermopiles 17, 18 from the output voltage values Vthermu, Vthermd of the two thermopiles 17, 18 based on equations (13) and (14), therefore, the flow rate V of the fluid can be measured in the manner described below.

Next, an explanation will be given of a method of measuring the fluid flow rate V accurately by correcting the output characteristics. Assume that the heater 16 generates heat at a temperature higher than the ambient temperature Tatm by a predetermined value, and that the fluid is passing through the flow sensor 11 at the flow rate (mass flow rate) V from the thermopile 17 toward the thermopile 18. Also, assume that $\Delta Tu(V)$: measured temperature of thermopile 17
$\Delta Td(V)$: measured temperature of thermopile 18
$Qu(V)$: energy supplied to thermopile 17 for flow rate V
$Qd(V)$: energy supplied to thermopile 18 for flow rate V
Cu0: initial heat capacity of thermopile 17
Cd0: initial heat capacity of thermopile 18

Figure 10:
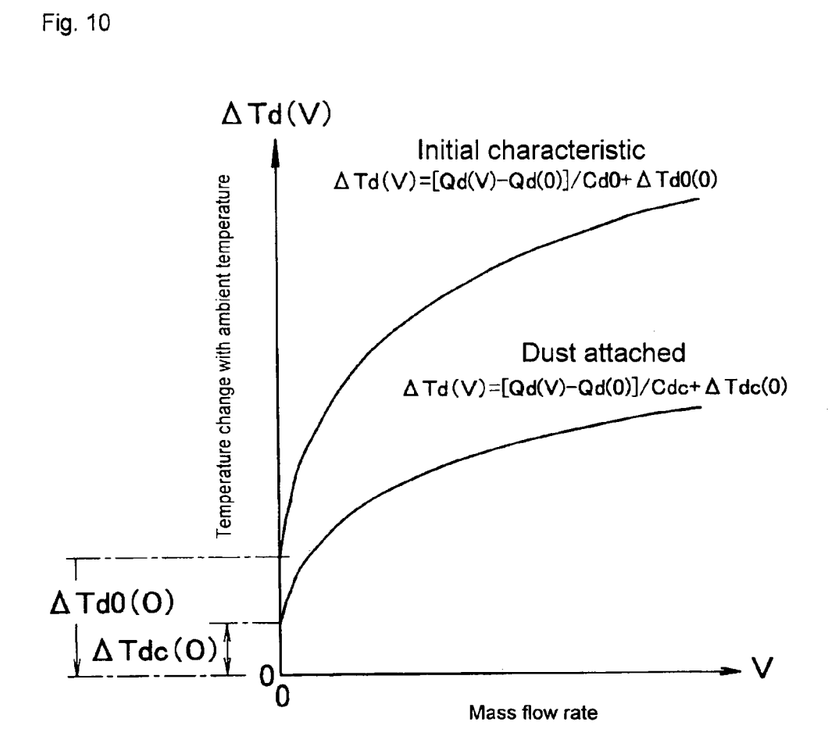
FIG. 10 shows the initial characteristic of the temperature ΔTd(V) measured by the downstream thermopile and the characteristic with dust attached.

The initial characteristics of the thermopiles 17, 18 substantially in the absence of dust attached are given by equations (15) and (16), respectively. The initial characteristic expressed by equation (16) is shown in FIG. 10. This initial characteristic is stored in the memory of the operation processing unit of the flow sensor 11.

$$\Delta Tu(V) = [Qu(V) - Qu(0)]/Cu0 + \Delta Tu0 \quad (15)$$

$$\Delta Td(V) = [Qd(V) - Qd(0)]/Cd0 + \Delta Td0 \quad (16)$$

where $\Delta Tu0(0)$, $\Delta Td0(0)$ are the offset temperatures of the initial characteristics of the thermopiles 17, 18, and given as $$\Delta Tu0(0) = Qu(0)/Cu0 \quad (17)$$

$$\Delta Td0(0) = Qd(0)/Cd0 \quad (18)$$

In the case where dust is attached to the thermopiles 17, 18 and the heat capacity thereof become Cuc (>Cu0), Cdc (>Cd0), respectively, the characteristics of the thermopiles 17, 18 are given by equations (19) and (20) below. The characteristic given by equation (20) is also shown in FIG. 10.

$$\Delta Tu(V) = [Qu(V) - Qu(0)]/Cuc + \Delta Tuc(0) \quad (19)$$

$$\Delta Td(V) = [Qd(V) - Qd(0)]/Cdc + \Delta Tdc(0) \quad (20)$$

where $\Delta Tuc(0)$, $\Delta Tdc(0)$ are the offset temperatures of the characteristics of the thermopiles 17, 18 with dust attached, and given as $$\Delta Tuc(0) = Qu(0)/Cuc \quad (21)$$

$$\Delta Tdc(0) = Qd(0)/Cdc \quad (22)$$

From equations (17) and (21), equation (23) below is derived.

$$Cuc/Cu0 = [\Delta Tu0(0)/\Delta Tuc(0)] \quad (23)$$

In similar fashion, from equations (18) and (22), the following equation (24) is obtained.

$$Cdc/Cd0 = [\Delta Td0(0)/\Delta Tdc(0)] \quad (24)$$

As long as the heat capacity Cu0, Cd0 and the offset temperatures $\Delta Tu0(0)$, $\Delta Td0(0)$ of the initial characteristics are known, therefore, the prevailing ratios Cuc(0)/Cu0(0), Cdc(0)/Cd0(0) (the corrected values of the heat capacity) between the heat capacities of the thermopiles 17, 18 are determined by equations (23), (24), measuring the offset temperatures $\Delta Tuc(0)$ and $\Delta Tdc(0)$ after dust is attached.

Next, equation (19) is rewritten as $$(Cuc/Cu0)\Delta Tu(V) = [Qu(V) - Qu(0)]/Cu0 + \Delta Tu0(0) \quad (25)$$

and, equation (20) is rewritten as $$(Cdc/Cd0)\Delta Td(V) = [Qd(V) - Qd(0)]/Cd0 + \Delta Td0(0) \quad (26)$$

The right sides of equations (25) and (26) indicate the initial characteristics of the thermopiles 17, 18, respectively. Thus, the offset temperature $\Delta Tuc(0)$ or $\Delta Tdc(0)$ after dust is attached is measured, and the ratios Cuc(0)/Cu0(0), Cdc(0)/Cd0(0) between the heat capacities of the thermopiles 17, 18 are determined by equations (23), (24), after which the measured temperature $\Delta Tu(V)$ of the thermopile 17 is multiplied by Cuc(0)/Cu0(0) or the measured temperature $\Delta Td(V)$ of the thermopile 18 is multiplied by Cdc(0)/Cd0(0) and, using the curve of each initial characteristic (the initial characteristics shown in FIGS. 5A, 5B, for example) stored in the memory, the flow rate V is calculated. In this way, the flow rate V can be measured accurately. This is equivalent to the fact that the output characteristic D1 after dust attaches as shown in FIG. 7 is corrected to coincide with the initial characteristic D0.

In the correction method described above, the heat capacity ratios Cuc(0)/Cu0(0), Cdc(0)/Cd0(0) are determined from the offset temperatures $\Delta Tuc(0)$, $\Delta Tdc(0)$ after dust attaches, and therefore the method of determining the offset temperatures $\Delta Tuc(0)$, $\Delta Tdc(0)$ is important. By blocking the flow of the fluid, the offset temperatures $\Delta Tuc(0)$, $\Delta Tdc(0)$ can be easily measured by the thermopiles 17, 18 and the ambient temperature measuring resistor 19. In view of the fact that there may be a case in which the fluid flow cannot be forcibly stopped, however, a method is described for determining the offset temperatures $\Delta Tuc(0)$, $\Delta Tdc(0)$ as accurately as possible without stopping the fluid flow forcibly.

The description that follows deals with a method of determining the offset temperature $\Delta Tdc(0)$ for the downstream thermopile 18. The offset temperature $\Delta Tuc(0)$ for the upstream thermopile 17 can also be determined in similar manner, though not described. First, a first method is described. The relation between the flow rate V and the supplied energy Qd(V) is represented by a monotonic incremental curve as shown in FIG. 4. The output characteristic $\Delta Td(V)$ of the downstream thermopile 18 also tends to increase monotonically as shown in FIG. 10. This tendency of monotonic increase indicates that in the case where the measured temperature $\Delta Td(V)$ of the thermopile 18 at a given time point is lower than the offset temperature $\Delta Td0(0)$ of the initial characteristic, at least dust is attached and the flow rate V is substantially zero. Specifically, in the case where the relation holds that $$\Delta Td(V) < \Delta Td0(0) \quad (27)$$

it is determined that the prevailing measured temperature $\Delta Td(V)$ is the offset temperature $\Delta Tdc(0)$ for the flow rate V of zero, and the heat capacity ratio at the particular instant is determined as $$Cdc/Cd0 = \Delta Tdc(0)/\Delta Tdc(0)$$

is determined thereby to correct the measured temperature of the thermopile 18. Incidentally, in the case where there are a plurality of values of the measured temperature $\Delta Td(V)$ satisfying the equation (27) during a predetermined period of time, the minimum value of them may be determined as the offset temperature $\Delta Tdc(V)$.

In the case where the flow sensor 11 requires no distinction between upstream and downstream, i.e. in the case where there is possibility of the fluid flowing both from the thermopile 17 to the thermopile 18 and from the thermopile 18 to the thermopile 17, and the flow rate in the opposite direction exists (in other words, in the case where the fluid is flowing from the thermopile 18 to the thermopile 17), then the relation $\Delta Td(V) < \Delta Td0(0)$ holds undesirably without regard to the value of the flow rate V. In order to prevent the measured temperature of the thermopile 18 from being corrected in such a case, the condition expressed by equation (27) for the downstream thermopile 18

$$\Delta Td(V) < \Delta Td0(0) \qquad (27)$$

requires the addition of the condition $$\Delta Tu(V) < \Delta Tu0(0) \qquad (28)$$

that the temperature change $\Delta Tu(V)$ of the upstream thermopile 17 is not higher than the offset temperature $\Delta Tu0(0)$. In the case where the fluid is flowing in the opposite direction, the relation $\Delta Tu(V) > \Delta Tu0(0)$ holds. As long as equations (27) and (28) are both satisfied, therefore, the flow rate can be considered to be zero without fail. Incidentally, in the case where the fluid is flowing in the opposite direction, equations (24) and (26) are used by replacing the upstream and downstream thermopiles 17, 18 with each other.

In the case where dust often attaches to the thermopile 18, the offset temperature $\Delta Tdc(0)$ of the thermopile 18 considerably decreases and the relation holds that $$\Delta Tdc(0) << \Delta Td0(0)$$

Therefore, even in the case where the measured value $\Delta Td(V)$ of the thermopile 18 satisfies the relation $$\Delta Td(V) < \Delta Td0(0)$$

the flow rate V may not be zero. In the case where the flow sensor 11 is used in a situation where dust is likely to attach often, therefore, the windless state with the flow rate V of zero is considered to prevail if the measured value is lower than the offset temperature at the particular time point (second method).

Specifically, assume that the first (initial characteristic) offset temperature is $\Delta Td0(0)$. In the case where the measured value $\Delta Td(V)$ satisfies the relation $$\Delta Td(V) \leq \Delta Td0(0)$$

the measured value $\Delta Td(V)$ is regarded as the offset temperature $\Delta Tdc1(0)$ at the particular time point, and the output characteristic is corrected by determining the heat capacity ratio from $$Cdc1/Cd0 = \Delta Td0(0)/\Delta Tdc1(0)$$

Next, in the case where the measured value $\Delta Td(V)$ satisfies the relation $$\Delta Td(V) \leq \Delta Tdc1(0)$$

the measured value $\Delta Td(V)$ is regarded as the offset temperature $\Delta Tdc2(0)$ at the particular time point, and the output characteristic is corrected by determining the heat capacity ratio from $$Cdc2/Cd0 = \Delta Td0(0)/\Delta Tdc2(0)$$

Further, in the case where the measured value $\Delta Td(V)$ satisfies the relation $$\Delta Td(V) \leq \Delta Tdc2(0)$$

the measured value $\Delta Td(V)$ is regarded as the offset temperature $\Delta Tdc3(0)$ at the particular time point, and the output characteristic is corrected by determining the heat capacity ratio from $$Cdc3/Cd0 = \Delta Td0(0)/\Delta Tdc3(0)$$

A similar process is repeated sequentially, and when the measured value $\Delta Td(V)$ satisfies the relation $$\Delta Td(V) \leq \Delta Tdcn-1\ (0)(n=4, 5, \ldots)$$

the measured value $\Delta Td(V)$ is regarded as the offset temperature $\Delta Tdcn(0)$ at the particular time point, and the output characteristic is corrected by determining the heat capacity ratio from $$Cdcn/Cd0 = \Delta Td0(0)/\Delta Tdcn(0)$$

In this method of correcting the output characteristic in steps, even in the case where dust attaches in an increasing amount and the curve representing the output characteristic undergoes a frequent change, the offset temperature following the change can be determined, and therefore the output characteristic can be corrected more accurately. In the case where the amount of dust attached changes little and the curve of the output characteristic is not changed so frequently, on the other hand, each time the offset temperatures $\Delta Tdc1(0)$, $\Delta Tdc2(0)$, $\Delta Tdc3(0)$ and so on are determined, the actual offset temperature $\Delta Tdc(0)$ is approached. In this way, the output characteristic is accurately corrected and the flow rate V measured with high accuracy.

Alternatively, the heater 16 can be used to determine that the flow rate V is zero (third method). The temperature of heat generated by the heater 16 reaches maximum at the windless time, and as long as the fluid flows, the temperature of heat generated tends to decrease. In addition, since dust is not substantially attached to the heater 16, the fluid flow rate is regarded to be zero in the case where the temperature of heat generated by the heater 16 is substantially equal to the temperature of heat generated at the windless time (V=0). In this way, the measured temperature $\Delta Td(V)$ at the particular time point is regarded as the offset temperature $\Delta Tdc(0)$ and the output characteristic is corrected.

A fourth method is used in the case where the thermopile 17 and the thermopile 18 have the same structure and the same heat capacity Cu0, Cd0 and are arranged symmetrically about the heater 16. In this method, the flow rate V is regarded as zero in the case where the measured temperature $\Delta Tu(V)$ of the thermopile 17 is substantially equal to the measured temperature $\Delta Td(V)$ of the thermopile 18.

Figure 11:
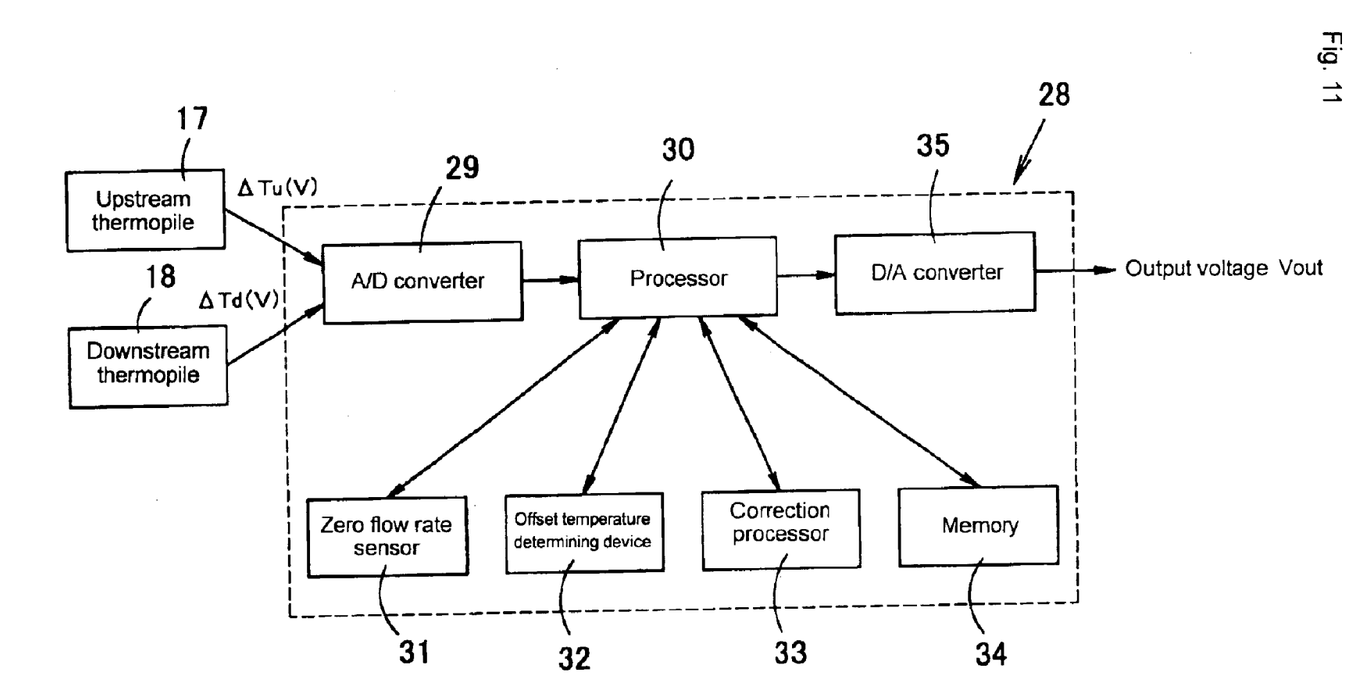
FIG. 11 shows a block diagram showing the configuration of the operation processing unit used with the flow sensor described above.

Next, the configuration of the operation processing unit 28 used for the flow sensor 11 is described with reference to FIG. 11. The operation processing unit 28 includes an A/D (analog-to-digital) converter 29, a processor 30, a zero flow rate sensing means 31, an offset temperature determining means 32, a correction processing unit 33, a memory 34 and a D/A (digital-to-analog) converter 35. These components are each configured of one or a plurality of microcomputers, electronic circuits, nonvolatile memories, etc. An analog signal representing the measured temperature ΔTu(V) of the thermopile 17 or an analog signal representing the measured temperature ΔTd(V) of the thermopile 18 is received from the thermopile 17 or 18, respectively, and the received analog signal is converted into a digital signal and output to the processor 30 by the A/D converter 29. The processor 30 transfers the measured temperature (digital signal) such as ΔTd(V) received from the A/D converter 29 to the zero flow rate sensing means 31 and the offset temperature determining means 32. The zero flow rate sensing means 31 detects the instant the flow rate becomes zero by any of the methods described above (by comparing the measured temperature ΔTd(V) with the offset temperature ΔTd0(0) of the initial characteristic, for example) based on the measured temperature ΔTd(V) received from the processor 30, and upon detection of the zero flow rate, returns the zero flow rate detection signal to the processor 30. The processor 30, upon receipt of the zero flow rate detection signal from the zero flow rate sensing means 31, transmits the zero flow rate detection signal to the offset temperature determining means 32. The offset temperature determining means 32, upon receipt of the zero flow rate detection signal, regards the prevailing measured temperature ΔTd(V) as the offset temperature ΔTdc(0), and transmits the value of the particular offset temperature ΔTdc(0) to the processor 30, which in turn transfers the same value of the offset temperature ΔTdc(0) to the correction processing unit 33. The correction processing unit 33, upon receipt of the offset temperature ΔTdc(0), calculates the heat capacity ratio Cdc/Cd0 according to equation (24), and thus corrects the measured temperature ΔTd(V) of the thermopile 18 as (Cdc/Cd0)ΔTd(V). Then, the data of the initial characteristic stored in the memory 34 is read, and the flow rate V corresponding to the corrected measured temperature (Cdc/Cd0)ΔTd(V) is determined from the initial characteristic. The flow rate V (digital signal) thus measured is converted into an analog voltage signal by the D/A converter 35 and output as an output voltage Vout.

In the foregoing embodiments, the structure with the thermopiles arranged on both sides of the heater is explained. The flow sensor according to the invention, however, may alternatively have a structure with a thermopile arranged only on one side of the heater. Also, the temperature measuring unit is not limited to the thermopile, but may be a resistor for temperature measurement or a semiconductor device such as a thermistor.

What is claimed is:

1. A flow sensor for measuring a flow rate of a fluid, comprising:
    a thin-film bridge unit supported in air over a surface of a substrate;
    a heater and a temperature measuring unit arranged on the bridge unit; and
    a memory device for storing a relation between a temperature measured by the temperature measuring unit and the flow rate of a fluid to be measured in an initial state;
    wherein an output of the temperature measuring unit is corrected using a ratio of a value of temperature measured by the temperature measuring unit with a flow rate of zero in the initial state to a temperature measured by the temperature measuring unit with a flow rate of zero during operation, and the flow rate of the fluid is determined based on the corrected value of the output of the temperature measuring unit and the relation stored in the memory device.

2. The flow sensor according to claim 1, wherein the temperature measuring unit includes a first temperature measuring unit and a second temperature measuring unit, the first and second temperature measuring units being arranged on the two sides of the heater, respectively, and the correction is carried out based on a temperature measured by at least one of the first and second temperature measuring units.

3. The flow sensor according to claim 1, wherein it is determined that the flow of the fluid is zero in a case where a temperature lower than a value of the measured temperature with the flow rate of zero the in the initial state is measured by the temperature measuring unit, and a prevailing temperature measured by the temperature measuring unit is regarded as the measured temperature with the flow rate of zero during operation.

4. The flow sensor according to claim 1, wherein it is determined that the flow rate of the fluid is zero in a case where a temperature lower than a value of the measured temperature with the flow rate of zero during operation is measured by the temperature measuring unit, and a prevailing temperature measured by the temperature measuring unit is updated as the measured temperature with the flow rate of zero during operation.

5. The flow sensor according to claim 1, wherein it is determined that the flow rate of the fluid is zero in a case where a temperature of heat generated by the heater is substantially equal to a temperature of heat generated by the heater with a flow rate of zero, and a prevailing temperature measured by the temperature measuring unit is regarded as a measured temperature with the flow rate of zero during operation.

6. The flow sensor according to claim 2, wherein it is determined that the flow rate is zero in a case where a temperature lower than the measured temperature with the flow rate of zero in the initial state is measured by each of the first and second temperature measuring units, and a prevailing temperature measured by each of the first and second temperature measuring units is regarded as a measured temperature with the flow rate of zero during operation.

7. The flow sensor according to claim 2, wherein it is determined that the flow rate of the fluid is zero in a case where a temperature measured by the first temperature measuring unit and a temperature measured by the second temperature measuring unit become equal to each other, and a prevailing temperature measured by each of the first and second temperature measuring units is regarded as a measured temperature with the flow rate of zero during operation.

8. A method of measuring a flow rate of a fluid using a heater for heat generation, a temperature measuring unit for measuring ambient temperature changing with the flow rate of the fluid, and memory device for storing a relation between the temperature measured by the temperature measuring unit and the flow rate of the fluid to be measured in an initial state,
    wherein a ratio of a value of the temperature measured by the temperature measuring unit with a flow rate of zero in the initial state to a temperature measured by the temperature measuring unit with a flow rate of zero during operation is corrected by multiplying the ratio by output of the temperature measuring unit, and the flow rate of the fluid is determined based on the corrected value of the output of the temperature measuring unit and the relation stored in the memory device.

* * * * *